US00RE33826E

United States Patent [19]

Mitchell

[11] E Patent Number: Re. 33,826

[45] Reissued Date of Patent: Feb. 18, 1992

[54] MICROSCOPE INSPECTION SLIDE

[75] Inventor: Vance C. Mitchell, Irvine, Calif.

[73] Assignee: Hycor Biomedical, Inc., Garden Grove, Calif.

[21] Appl. No.: 409,951

[22] Filed: Sep. 7, 1989

Related U.S. Patent Documents

Reissue of:

[64] Patent No.: 4,637,693
Issued: Jan. 20, 1987
Appl. No.: 758,056
Filed: Jul. 23, 1985

U.S. Applications:

[63] Continuation of Ser. No. 258,839, Oct. 12, 1988, abandoned.

[51] Int. Cl.[5] ..... G01N 21/01; G02B 21/34

[52] U.S. Cl. ..... 359/398

[58] Field of Search ..... 350/534, 535, 536; 356/244, 246

[56] References Cited

U.S. PATENT DOCUMENTS

| | | | |
|---|---|---|---|
| 1,693,961 | 12/1928 | Risch . | |
| 2,039,219 | 4/1936 | Hanssen . | |
| 3,481,659 | 12/1969 | Rosenberg . | |
| 3,565,537 | 2/1971 | Fielding . | |
| 3,777,283 | 12/1973 | Elkins | 350/536 |
| 3,961,346 | 6/1976 | White | 350/536 |
| 4,171,866 | 10/1979 | Tolles | 350/536 |
| 4,245,907 | 1/1981 | Rosen . | |
| 4,299,441 | 11/1981 | Parker | 350/536 |
| 4,441,793 | 4/1984 | Elkins | 350/536 |
| 4,447,140 | 5/1984 | Campbell et al. | 350/534 |
| 4,607,921 | 8/1986 | Miller | 350/536 |

FOREIGN PATENT DOCUMENTS 2127577A 4/1984 United Kingdom .

*Primary Examiner*—Jon W. Henry
*Attorney, Agent, or Firm*—Edward S. Irons

[57] ABSTRACT

A microscope inspection slide including at least one examination chamber formed by bonding together a base plate and a cover plate. The base plate having a chamber floor surface raised above a deck surface on the base plate, and the cover plate having a roof surface with a depth control ridge positioned about a portion of the edge of the chamber roof surface. Bonding the cover plate to the base plate forms an examination chamber with the distance between the roof surface and floor surface maintained constant, and entrapped gases and excess fluid allowed to drain from the examination chamber through notches in the depth control ridge.

16 Claims, 3 Drawing Sheets

MICROSCOPE INSPECTION SLIDE

Matter enclosed in heavy brackets [ ] appears in the original patent but forms no part of this reissue specification; matter printed in italics indicates the additions made by reissue.

*This application is a continuation of Ser. No.* 258,839, filed Oct. 12, 1988, and now abandoned.

BACKGROUND OF THE INVENTION

Laboratory analysis of biological fluids such as blood, spinal fluid, cell cultures and urine can include microscopic examination of a specimen liquid to determine the presence of concentration of suspended particulate matter such as cells. Typically, microscopic examination of liquid specimens has been accomplished by placing a drop of the specimen liquid on a flat transparent microscope slide and then placing a thin flat transparent coverslip over the specimen. The weight of the coverslip and the inherent capillation between the liquid specimen the microscope slide and the coverslip retains the coverslip on the slide and distributes the liquid as a film in the space between the slide and the coverslip. The slide is then placed on a microscope stage and the liquid specimen between the slide and the coverslip is examined.

The procedures involved in preparing slide, liquid specimen and coverslip combinations for optical examination requires an excessive amount of manual manipulation which inevitably results in uncontrollable and unpredictable variations in the specimen examined. An inevitable and most critical variation resulting from use of the above described slide/coverslip combination is the thickness of the specimen between the slide and the coverslip. This variation is important because when a microscopic examination of the specimen is made such examination is over an area of the specimen and provides a count of selected particulate species. Determination of the useful parameter—concentration of particulate species—requires the multiplication of the examined area by the depth of the specimen to obtain the volume of specimen in which the counted particulate matter is suspended. To determine relative concentration differences between counted particulate species in multiple specimens or to determine concentration differences between a selected specimen and a standard specimen the thickness of each specimen must be essentially equal or again must be known so that calculations of volumes in which the particulate species are suspended can be made. Assumptions regarding the thickness of liquid specimens are not useful because uncontrollable variables such as variations in the surface tension from sample to sample which substantially effects thickness, variations in the amount of liquid used for preparing slide specimens, entrapment of air between the slide and coverslip and variations in the pressure exerted between the coverslip and the slide all cause differences in specimen thickness. Further, degrading the utility of such microscopic counts are perturbations in the distribution of particulates in specimens caused by inadvertant translational movement of coverslips with respect to slides during preparation of slide/coverslip assemblies which can result in non-uniformity of the distribution of particulates in specimens.

Attempts have been made to provide inspection slides which avoid the above described limitations of separate slide/coverslip combinations. Some of these efforts have been based on molding unitary transparent plastic slide/coverslip structures with a liquid specimen drawn into examination chambers by capillation. Such devices are disclosed in U.S. Pat. Nos. 3,961,346; 3,777,283; and 4,299,441. Other efforts include fabrication of examination chambers from two plastic molded components bonded or attached together as slide/coverslip structures into which again liquid specimens are drawn by capillation. Such devices are disclosed in U.S. Pat. No. 3,565,537 and United Kingdom Application No. 2,127,557A. All of these attempts to provide useful inspection slide designs have failed due to such deficiencies as: inability to bleed off entraped gases in the examination chambers; failure to provide parallel floor and roof surfaces for the examination chambers which are accurately distanced from each other; failure to provide sample chambers which have thicknesses less than the depth of field of optical instruments used to examine specimens which can cause eye fatigue to the technician who is required to refocus the instrument in order to complete an examination of a specimen; failure to provide bonding systems for accurate positioning of slide/coverslip structures such as that disclosed in U.S. Pat. No. 3,565,537 which includes no expansion space for melted bonding ridges thereby precluding accurate positioning; or including excessively large openings from the examination chambers which enhance evaporation of specimen fluids and accordingly decrease the time between charging an examination chamber and the time when the specimen must be examined.

SUMMARY OF THE INVENTION

Accurately spacing and maintaining the floor and roof surfaces of an examination chamber from each other is a critical requirement for assuring that known volumes of specimen liquid are introduced into examination chambers so that accurate determinations of the concentration of particulate matter in specimens by counting the suspended particulate matter can be made. In addition to errors caused by variable specimen volumes, errors in counting can also very readily arise if the optical instrument, such as a microscope, used to view the suspended particulate manner is not in focus throughout the entire depth of the specimen in the examination chamber. These errors arise because as the optical instrument is refocused to count particulate matter at a new depth that particulate matter previously counted can migrate to the new depth where the instrument is focused or particulate matter not previously counted can migrate away from the depth where the instrument is focused. Even if a skilled technician makes the examination, errors due to refocussing are inevitable because the refocussing inevitably causes extreme eye fatigue. Therefore, the depth of examination chambers should be maintained within the depth of field of instruments used to examine specimens. The depth of the examination chamber for optical examination of most biological fluids should be maintained at 0.004 inches which is equal to or less than one focal plane of optical instruments used for this type of laboratory work. Concurrent with the requirement to maintain the specimen in the depth of field of the inspecting optical instrument is the associated requirement of assuring that the optical axis of the inspecting instrument be perpendicular to the floor surface of the examination chamber so that as the inspection slide is translated to permit examination of different volumes of the specimen the specimen remains in the depth of field of the instrument.

These requirements are met by the present invention which provides inspection slides, with fixed coverslips, having examination chambers with constant depths that can be maintained shorter than the depth of field for inspecting optical instruments and also has examination chambers from which entraped gases can be readily bleed, and from which excess specimen fluids can be readily drained without contamination of specimens in adjoining chambers.

An inspection slide according to the present invention is assembled by placing a cover plate fabricated from transparent plastic and having at least one coverslip portion on top of a base plate also fabricated from transparent plastic and having at least one examination chamber floor which is a flat and optically smooth surface. The coverslip portion of the cover plate is positioned so that it essentially overlays the examination chamber floor. This configuration is then maintained by bonding the cover plate to the base plate. The bonds between the base plate and the cover plate are made at locations remote from the examination chamber so that dimensional distortions inevitably associated with bonding plastic structures are minimized by the distances between the bonding points and the examination chambers.

Examination chambers in the inspection slide of the present invention are formed from the abutting contact of the coverslip portion of a cover plate onto the examination chamber floor surface defined on a base plate. The abutting contact is maintained by bonding portions of the cover plate to the base plate. A second function provided by the bonded portions of the cover plate and base plate besides maintaining contact between these two plates is the isolation of examination chambers so that a liquid specimen which drains from one examination chamber will not migrate to a second examination chamber and contaminate a second specimen. The examination chamber floor surfaces on a base plate are flat optically smooth surfaces which are raised above a main base plate surface, and the coverslip portions of a cover plate include examination chamber roofs which are also flat and optically smooth surfaces but are recessed into the cover plate and are of a similar general shape as the examination chamber floor surfaces. However the examination chamber roofs, which are recessed, have smaller surface areas than the examination chamber floor surfaces, and surrounding the examination chamber roofs are depth control ridges spaced a uniform distance from the examination chamber roof surfaces. Additionally the depth control ridges extend beyond the outer edge of the examination chamber floor surfaces when a cover plate and base plate are assembled. Therefore, the examination chamber roofs are displaced from the examination chamber floors by distances determined by the depth control ridges.

In combination with the examination chamber floor and roof surfaces, and the depth control ridges are at least one notch cut into each depth control ridge which extends from outside the areas defined by the examination chamber floor surfaces and then over each examination chamber floor surface to the examination roof surface. These notches provide channels for bleeding entraped gases from the examination chambers and for draining excess specimen fluids from the examination chambers.

Each of the examination chambers on an inspection slide of the present invention has an opening facing an edge of the base plate. These openings are formed by a ramp surface intersecting each examination chamber floor surface and by the examination chamber roof positioned above the intersection of the examination chamber floor and the ramp surface. This configuration of ramp surface and examination chamber roof permits efficient charging of the examination chamber with specimen fluid. Such charging can be accomplished by a pipette or dropper positioned at the opening to introduce a drop of specimen fluid, the specimen floor will wet both the examination chamber roof and floor. The wetted examination chamber roof and floor guides the specimen in to fill the examination chamber by capillation. During the filling of an examination chamber entraped gases are bleed through the notches in the depth control ridge and after filling of an examination chamber excess specimen fluid is drained through the same notch.

Though capillation retains specimen fluids in examination chambers, evaporation of the specimen fluids through the opening to the examination chambers can render a charged examination chamber useless if sufficient time lapses between the filling of the examination chamber and the examination of the chamber under an optical instrument. To preclude such a problem the examination chamber roof can be configured to overhang the ramp surface of the present invention in one embodiment and to include lips which extend from the examination chamber roof to the ramp surface where they are bonded to the ramp so as to reduce the area of the opening and thus decrease evaporation rates for specimen fluids. The lips can extend along most of the length of the examination chamber roof edge adjacent the opening used to charge the examination chamber except for the central portion of the opening where a semicircular portion of the examination chamber roof can be cut out to facilitate charging the examination chamber. Because the lips from the examination chamber roof will provide guiding surfaces a drop of specimen fluid placed at the semicircular cutout in the examination chamber roof will first be drawn along the two lengths of the lips and then will be drawn into the examination chamber. In accordance with the present invention the lips are positioned over the ramp surface so that a volume of specimen fluid is positioned in front of the examination chamber. This volume of fluid must be evaporated before that in the examination chamber can be evaporated.

BRIEF DESCRIPTION OF THE DRAWINGS

In the drawings.

Corresponding components are designated by the same reference numerals throughout the various figures.

DETAILED DESCRIPTION OF THE INVENTION

Figure 1:
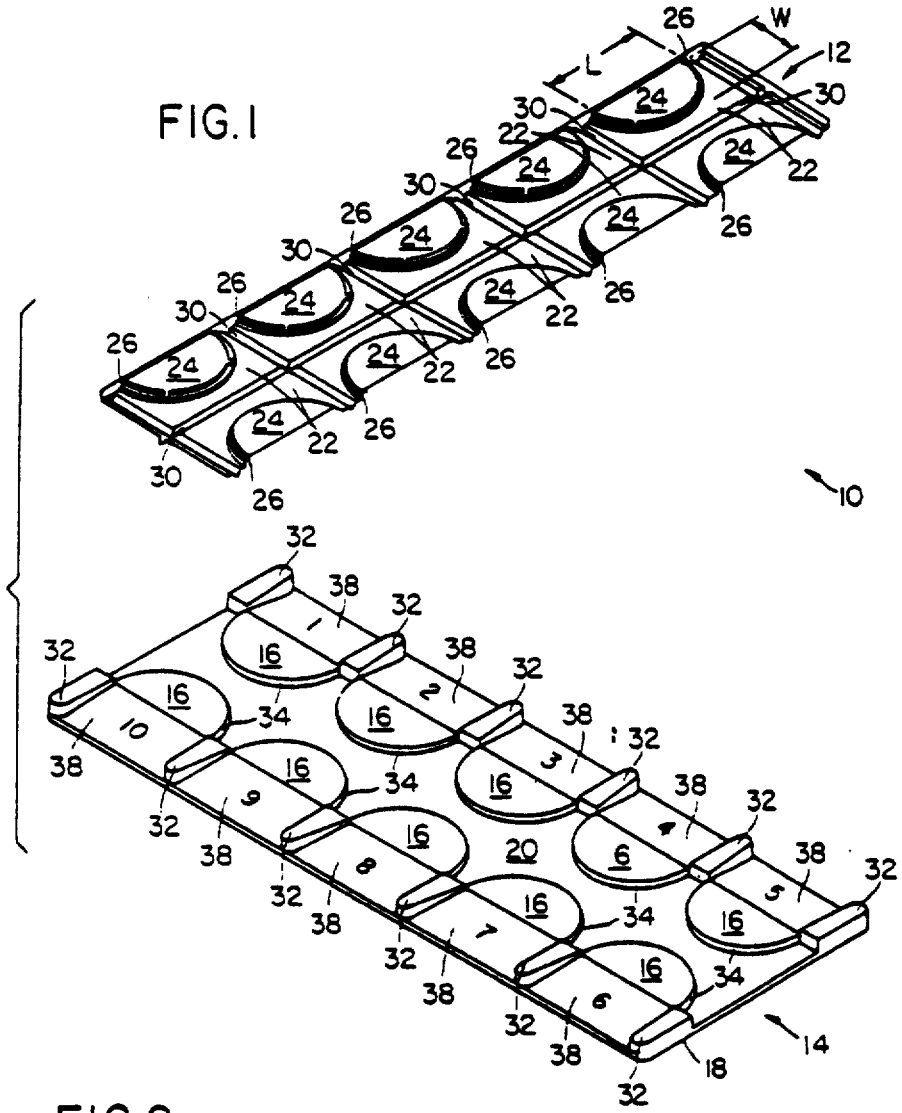
FIG. 1 is an exploded perspective view of an inspection slide according to the present invention.
Figure 2:
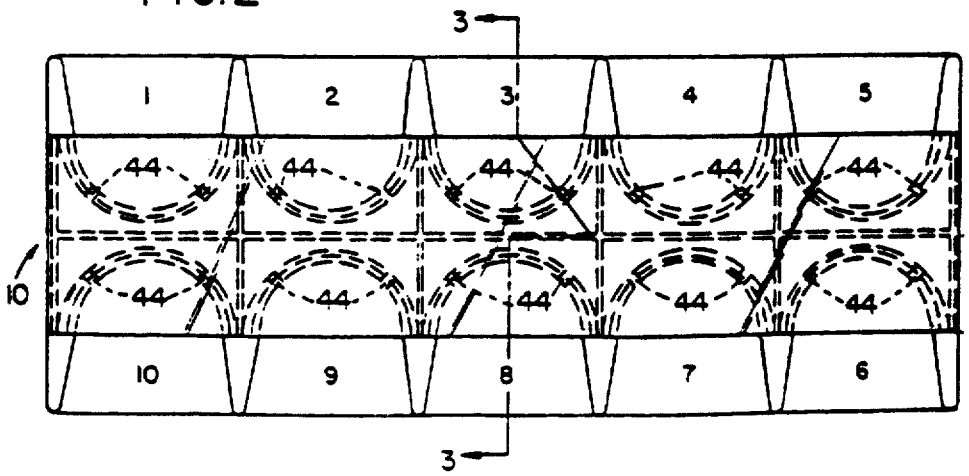
FIG. 2 is a top plan view of an assembled inspection slide according to the present invention.

Referring now to the drawings, an exploded perspective view of an inspection slide according to the present invention is illustrated in FIG. 1 where it is generally designated by reference numeral 10. Inspection slide 10 includes cover plate 12 and base plate 14. A top plan view of an assembled inspection slide 10 as shown in FIG. 1 is shown in FIG. 2.

The base plate 14 for an inspection slide 10 includes examination chamber floor surfaces 16 which are flat optically smooth surfaces. In accordance with the present invention one or more examination chamber floor surfaces 16 can be oriented on a base plate 14. The examination chamber floor surfaces 16 are oriented on the base plate 14 so that the examination chamber floor surface 16 is parallel to the bottom surface 18 of the base plate 14. Having the examination chamber floor surfaces 16 parallel to the bottom surface 18 of the base plate 14 assures that when the base plate 14 is positioned on the stage of an optical instrument having its optical axes perpendicular to the stage the examination chamber floor surfaces 16 will also be perpendicular to the optical axis of the instrument. In addition to being parallel to the bottom surface 18 of the base plate 14 the examination chamber floor surfaces 16 are also raised above an upper deck 20 of the base plate 14.

Cover plate 12 has recessed below a lower surface 22 examination chamber roofs 24, which like the examination chamber floor surfaces 16 are flat and optically smooth surfaces. The examination chamber roofs 24 have surface areas which are generally the same shape as those of the examination chamber floor surfaces 16 but the examination chamber roofs 24 have shorter linear dimensions, L and W (See FIG. 1). Surrounding the examination chamber roofs 24 are depth control ridges 26 which are also recessed below the lower surface 22 of the cover plate 12. The depth control ridges 26 are not recessed as deep as the examination chamber roofs 24, but the depth control ridges 26 do extend from the examination chamber roofs 24 out to locations beyond the surface areas of the examination chamber floor surfaces 16. Therefore, the cover plates 12 can be positioned on the base plates 14 so that the examination chamber roofs 24 are supported via the depth control ridges 26 at constant distances determined by the depth control ridges 26 from the examination chamber floor surfaces 16.

The depth control ridges 26 extend from the examination chamber roof 24 on all sides except one, that side being where the examination chamber 28 is charged with specimen fluid. In order for the examination chamber 28 to have a depth which is less than the depth of field for optical instruments which would normally be used to examine specimens in examination chambers 28 the depth control ridges 26 are preferably maintained so as to have the examination chamber roofs 24 recessed 0.0045 inches ±0.0005 inches from the surfaces of the depth control ridges 26 which contact the examination chamber floor surfaces 16. The present invention can also be used for special applications such as hemacytometry which previously required accurately ground and polished glass slide/coverslip combinations. For this application a counting grid is etched on the chamber floor 16 using known techniques, and the depth control ridges 26 are preferably maintained so as to have the examination chamber roofs 24 recessed 0.010 inches ±0.001 inches from the surface of the depth control ridges 26 which contact the examination chamber floor surfaces 16.

Extending from the lower surface 22 of the cover plate 12 are energy directing ridges 30. When the cover plate 12 is positioned on top of the base plate 14, the energy directing ridges 30 are located between examination chamber floor surfaces 16. Such positioning of the cover plate 12 with respect to the base plate 14 is assured by tabs 32 located between the examination chamber floor surfaces 16, at the edges of the base plate 14 and raised above the examination chamber floor surfaces 16 a distance essentially equal to the thickness, of the cover plate 12. The tabs 32 between the examination chamber floor surfaces 16 assure proper positioning of the cover plate 12 in the dimension between the tabs 32 with respect to the base plate 14 while the energy directing ridges 30 which extend from the lower surface 22 of the cover plate 12 and which are essentially dimensioned to fit between and in close proximity to the supports 34 for the examination chamber floor surfaces 16 assure proper positioning of the cover plate 12 in the dimension perpendicular to that defined by tabs 32. When the cover plate 12 is properly positioned on base plate 14 the energy directing ridges 30 are ultrasonically welded to the base plate 14 using techniques known in the art. Excess melted energy directing ridge 30 material can flow out over the upper deck 20 surface and thereby ensure proper positioning of the examination roof 24 and floor 16 surfaces via the depth control ridges 26.

For each examination chamber 28 there is a ramp surface 38 extending up from an outer edge of the base plate 14 to the examination chamber floor surface 16 and intersecting the examination chamber floor surface 16 along a line just under the examination chamber roof 24. The opening between the examination chamber floor surface 16 and the examination chamber roof 24 defined along the line where the ramp 38 and examination chamber floor surface 16 intersect provides a gate for charging the examination chamber 28 with a specimen fluid. Capillation draws fluids which are positioned on the ramp 38 at the edge of examination chamber roof 24 into the examination chamber 28.

Three disadvantages associated with charging examination chambers by capillation are:

(i) the specimen fluid can evaporate through the same opening used to charge the examination chamber;

(ii) the examination chamber may not be evenly and quickly filled with specimen fluid; and, (iii) a careless user can contaminate the optics of an optical instrument with excess specimen fluid retained at the edge of the opening to the examination chamber.

The examination chamber roof 24, in another embodiment of the present invention which addresses these disadvantages, extends over the intersection of the examination chamber floor 16 and the ramp 38 along the entire length of that intersection except for the central portion of the opening where a semi-circular recess is cut into the cover plate 12. (See FIGS. 4 and 5). These recesses provide charging ports 40 where a drop of specimen fluid can be positioned and taken by capillation into the examination chambers 28. Positioning the charging ports 40 at the center of the opening to each examination chamber 28 reduces the possibility of a careless technician contaminating specimen fluids in adjoining examination chambers 28. Another feature of this embodiment is the extension of the examination roof 24 beyond the intersection of the examination chamber floor surface 16 and the ramp 38, and the provision of lip ridges 42 along the two lengths of the examination chamber roof 24 which approaches the surface of the ramp 38 where they are ultrasonically welded when cover plate 12 is welded to base plate 14. Volumes having triangular cross sectional areas are then defined between lip ridges 42, examination chamber roof 24 and ramp 38. Placing a drop of specimen fluid at a charging port 40 will result in the fluid being drawn by capillation along the length of the lip ridges 42 because the depth from the examination chamber roof 24 to the ramp 38 is greater than the distance between the examination chamber roof 24 to the exmination chamber floor surface 16. After filling the volumes along the lengths of the lip ridges 42 the specimen fluid will evenly fill the examination chamber 28 from the opening back. When the examination chamber 28 is filled, a reservoir is effectively formed behind the lip ridges 42. Evaporation of the specimen fluid in the examination chamber 28 can not begin until the fluid in the reservoir is first evaporated. The reservoir additionally provides for contained storage of specimen fluid to prevent contamination of optics by careless use of the inspecting instrument.

Figure 3:
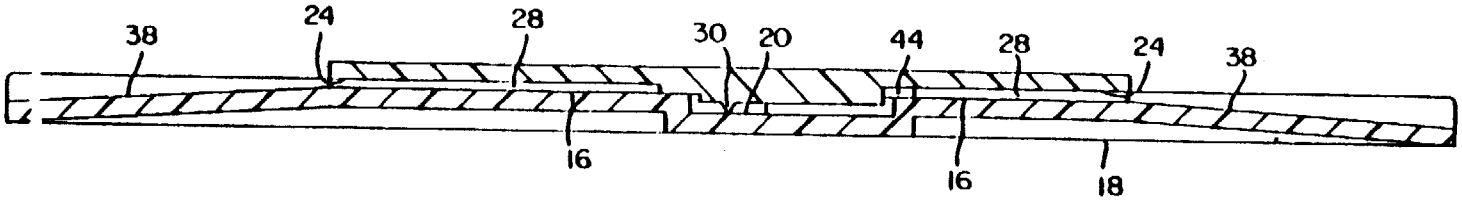
FIG. 3 is an enlarged sectional view of an inspection slide according to the present invention showing two examination chambers that is taken along line 3—3 of FIG. 2.
Figure 5:
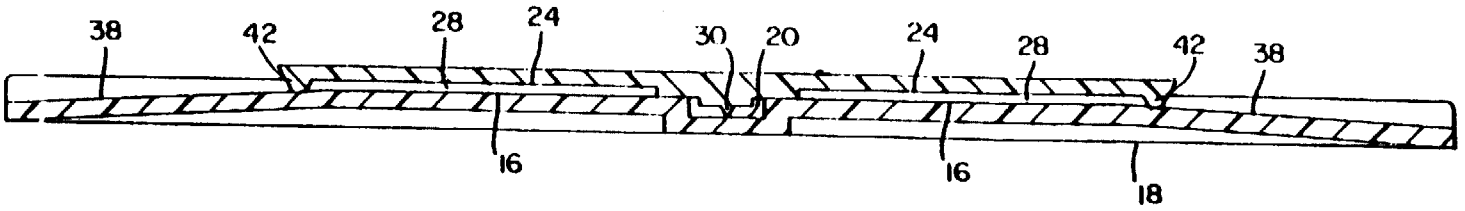
FIG. 5 is an enlarged sectional view of an inspection slide according to the embodiment shown in FIG. 4 showing two examination chambers that is taken along line 5—5 of FIG. 4.
Figure 4:
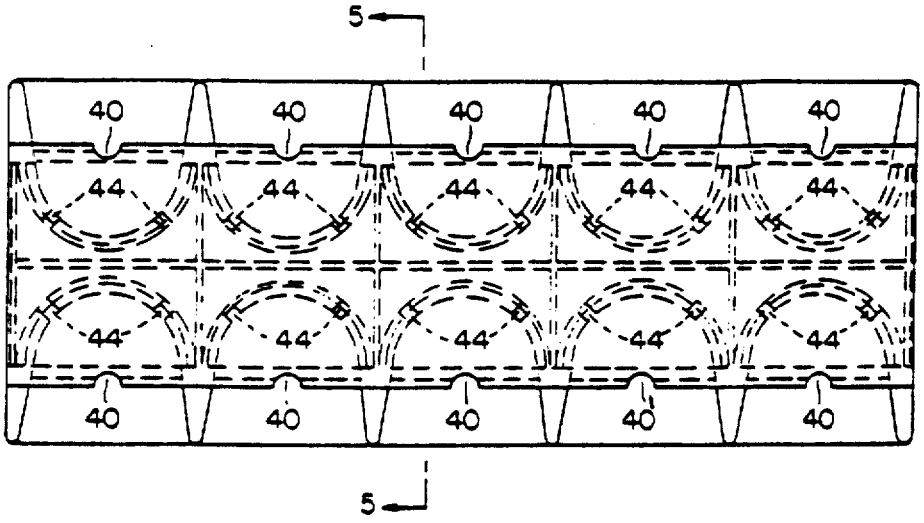
FIG. 4 is a top plan view of an assembled inspection slide with decreased openings to examination chambers.

Whether the embodiment for the opening to the examination chambers 28 shown in FIGS. 2 and 3 or that shown in FIGS. 4 and 5 is used there are positioned at the back portion of each examination chamber 28 on the depth control ridges 26 notches 44 which are cut out to the outer edges of the depth control ridges 26 so that both entraped gases and excess fluid can be drained from the examination chambers 28 to ensure complete filling of the examination chamber with specimen fluid. The notches 44 extend from between the examination chamber roof 24 and floor 16 out beyond the edge of the examination chamber floor surface 16 so both gases and fluids can easily be drained from the examination chamber 28. The volumes of the openings provided by the notches 44 are sized so as not to provide preferential capillation for draining specimen fluid from the examination chamber.

When excess specimen fluid is drained from an examination chamber 28 that fluid does not contaminate the specimen fluids in any adjoining examination chamber 28 because the energy directing ridges 30 which are ultrasonically welded to the base plate 12 completely enclose each examination chamber where the drained fluid can flow and, therefore, prevents migration of specimen fluid from one examination chamber 28 to another.

Inspection plates 10 of the present invention may be fabricated from acrylic plastic by injection molding the cover plate 12 and base plate 14 and then ultrasonically welding them together. The acrylic plastic should have an index of refraction essentially equal to glass and should be of a grade which is wettable and free from acid affinity. The examination chamber roof 24 and floor 16 surfaces can be formed by use of mold surfaces which are polished optically flat.

To facilitate counting suspended particulate materials appropriate grid lines can be etched onto the surfaces of the base plates 14 by techniques which are known in the art.

What is claimed is:

1. A slide for use in the examination of liquid specimens, said slide comprising:

a base plate having at least one flat examination chamber floor surface, said examination chamber floor surface being raised above an upper deck surface of said base plate;

a cover plate having at least one flat examination chamber roof surface, said examination chamber roof surface being recessed from a lower surface of said cover plate and said examination roof surface having a smaller surface area over said examination chamber floor surface;

a depth control ridge extending away from said examination chamber roof surface on all sides, but one, a sufficient distance to extend beyond the edge of said examination chamber floor surface so that positioning said examination chamber roof surface over said examination floor surface results in a fixed distance being determined by said depth control ridge between said examination chamber roof and floor surfaces, said depth control ridges having at least one notch extending between the examination chamber and the edge of said depth control ridge furthest from said examination chamber to provide for drainage onto said upper deck surface;

bonding means extending from said cover plate so that positioning said cover plate on said base plate and bonding said cover plate to said upper deck surface affixes said cover plate to said base plate and also forms an essentially continuous bond between said base plate and said cover plate about the perimeter of each examination chamber.

2. A slide for use in the examination of liquid specimens, said slide comprising:

a base plate having at least one flat examination chamber floor surface, said examination chamber floor surface being raised above an upper deck surface of said base plate;

a cover plate having at least one flat examination chamber roof surface, said examination chamber roof surface being recessed from a lower surface of said cover plate and said examination chamber roof surface having a smaller surface area over said examination chamber floor surface;

a depth control ridge extending away from said examination chamber roof on all sides, but one, a sufficient distance to extend beyond the edge of said examination chamber floor surface so that positioning said examination chamber roof surface over said examination floor surface results in a fixed distance being determined by said depth control ridge between said examination chamber roof and floor surfaces, said depth control ridge having at least one notch extending between the examination chamber and the edge of said depth control ridge furthest from said examination chamber to provide for drainage onto said upper deck surface;

bonding [menas] *means* extending from said base plate so that [positionining] *positioning* said cover plate on said base plate and bonding said lower surface of said cover plate affixes said cover plate to said base plate and also forms an essentially continuous bond between said base plate and said coverplate about the perimeter of each examination chamber.

3. A slide according to either claim 1 or 2 wherein said cover plate and said base plate are fabricated from transparent plastic.

4. A slide according to either claim 1 or 2 wherein said distance determined by said depth control ridge between said examination chamber roof and floor is 0.0045±0.0005 inches.

5. A slide according to either to claim 1 or 2 wherein said distance determined by said depth control ridge between said examination chamber roof and floor is 0.010±0.001 inches.

6. A slide according to either claim 1 or 2 wherein for each examination chamber a ramp means intersects said examination chamber floor along one side of said examination chamber, said examination chamber roof overhangs said intersection, and at least one lip means extends between said examination chamber roof and said ramp means along a portion of the length of said intersection between said ramp means and said examination chamber floor.

*7. A slide for use in the examination of liquid specimens, said slide comprising:*

*a base plate having at least one flat examination chamber floor surface, said examination chamber floor surface being raised above an upper deck surface of said base plate;*

*a cover plate having at least one flat examination chamber roof surface, said examination chamber roof surface being recessed from a lower surface of said cover plate and said examination roof surface having a smaller surface area over said examination chamber floor surface;*

*a depth control ridge extending away from said examination chamber roof surface on all sides, but one, a sufficient distance to extend beyond the edge of said examination chamber floor surface so that positioning said examination chamber roof surface over said examination floor surface results in a fixed distance being determined by said depth control ridge between said examination chamber roof and floor surfaces;*

*bonding means extending from said cover plate so that positioning said cover plate on said base plate and bonding said cover plate to said upper deck surface affixes said cover plate to said base plate and also forms an essentially continuous bond between said base plate and said cover plate about the perimeter of each examination chamber.*

*8. A slide for use in the examination of liquid specimens, said slide comprising:*

*a base plate having at least one flat examination chamber floor surface, said examination chamber floor surface being raised above an upper deck surface of said base plate;*

*a cover plate having at least one flat examination chamber roof surface, said examination chamber roof surface being recessed from a lower surface of said cover plate and said examination chamber roof surface having a smaller surface area over said examination chamber floor surface;*

*a depth control ridge extending away from said examination chamber roof on all sides, but one, a sufficient distance to extend beyond the edge of said examination chamber floor surface so that positioning said examination chamber roof surface over said examination floor surface results in a fixed distance being determined by said depth control ridge between said examination chamber roof and floor surfaces;*

*bonding means extending from said base plate so that positioning said cover plate on said base plate and bonding said lower surface of said cover plate affixes said cover plate to said base plate and also forms an essentially continuous bond between said base plate and said cover plate about the perimeter of each examination chamber.*

*9. A slide according to either claim 7 or 8 wherein said cover plate and said base plate are fabricated from transparent plastic.*

*10. A slide according to either claim 7 or 8 wherein said distance determined by said depth control ridge between said examination chamber roof and floor is 0.0045±0.0005 inches.*

*11. A slide according to either claim 7 or 8 wherein each examination chamber includes means for venting entrapped gases and wherein for each examination chamber a ramp means intersects said examination chamber floor along one side of said examination chamber, said examination chamber roof overhangs said intersection, and at least one lip means extends between said examination chamber roof and said ramp means along a portion of the length of said intersection between said ramp means and said examination chamber floor.*

*12. A unitary slide for use in examination of a liquid specimen said slide comprising an examination chamber defined by base and cover plates*

*said base plate having at least one elevated flat, optically smooth examination chamber floor surface,*

*said cover plate having at least one recessed flat, optically smooth examination chamber roof surface*

*said roof surface of said cover plate being spaced above and parallel to said floor surface of said base plate*

*the spacing between said parallel examination chamber floor and roof surfaces being substantially uniform and being predetermined by a depth control means adjacent a portion of the perimeter of said chamber;*

*said base and cover plate being ultrasonically welded, said weld being spaced away from said depth control means by which said substantially uniform spacing between said examination floor and roof surfaces is predetermined.*

*13. A unitary slide as defined by claim 12 in which said base plate comprises said depth control means.*

*14. A unitary slide as defined by claim 12 in which said cover plate comprises said depth control means.*

*15. A unitary slide as defined by any of claims 12, 13, or 14 further comprising means in said cover plate to permit the exit of fluids from said examination chamber.*

*16. Separate cover and base plate elements for assembly by ultrasonic welding to provide a unitary liquid specimen examination slide having at least one examination chamber*

*said base plate having at least one flat optically smooth examination chamber floor surface,*

*said cover plate having at least one flat, optically smooth examination chamber roof surface,*

*at least one of said base and cover plates having chamber depth control means for maintaining said chamber floor and roof surfaces in a predetermined spaced, parallel relationship when said base and cover plates are assembled and ultrasonically welded, and*

*at least one ultrasonic energy directing means spaced sufficiently away from said depth control means to yield a unitary ultrasonically welded slide having a chamber of uniform depth defined by said predetermined, parallel spaced relationship of said optically smooth chamber floor and roof surfaces.*

* * * * *